United States Patent [19]

Lafont

[11] 4,094,591
[45] June 13, 1978

[54] ELECTRIC DEVICE CONTROLLING THE MOVEMENT OF THE MIRROR IN AN EXTERNAL REARVIEW MIRROR UNIT

[75] Inventor: Raymond Lafont, Paris, France

[73] Assignee: B.S.G. International Limited, Birmingham, England

[21] Appl. No.: 699,851

[22] Filed: Jun. 25, 1976

[30] Foreign Application Priority Data

Jun. 27, 1975 France .............................. 75 20407

[51] Int. Cl.² .............................................. G02B 5/08
[52] U.S. Cl. ................................................... 350/289
[58] Field of Search ........................... 350/289; 74/801

[56] References Cited

U.S. PATENT DOCUMENTS 3,857,631  12/1974  Morgenstern et al. .............. 350/289
3,972,597   8/1976  Repay et al. ......................... 350/289

Primary Examiner—F. L. Evans
Attorney, Agent, or Firm—Diller, Brown, Ramik & Wight

[57] ABSTRACT

This mechanism relates to an electrically controlled rearview mirror assembly comprising a housing, a moveable mirror mounted within the housing, and a control system within the housing for imparting movement of the mirror along a first and second axes of rotation. The control system includes a reversible electrical motor driving through a reduction gear to impart rotational movement of first and second driven means which effect movement of the mirror along the first and second axes respectively, and selector means selectively coupling the reduction gear to the first and second driven means.

10 Claims, 3 Drawing Figures

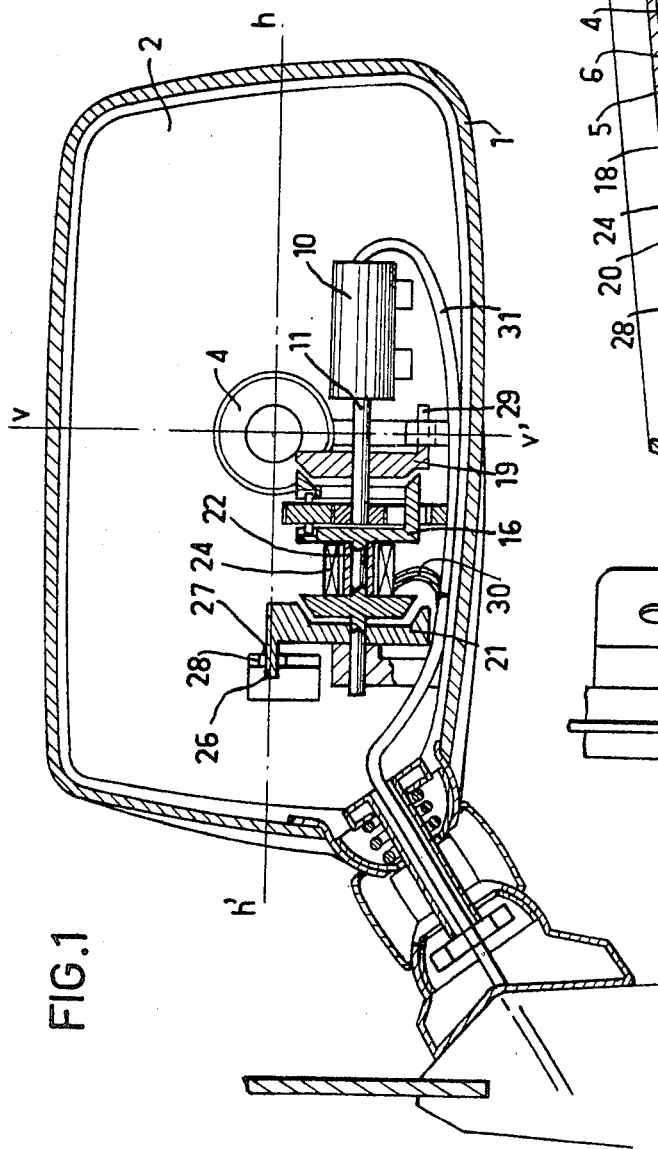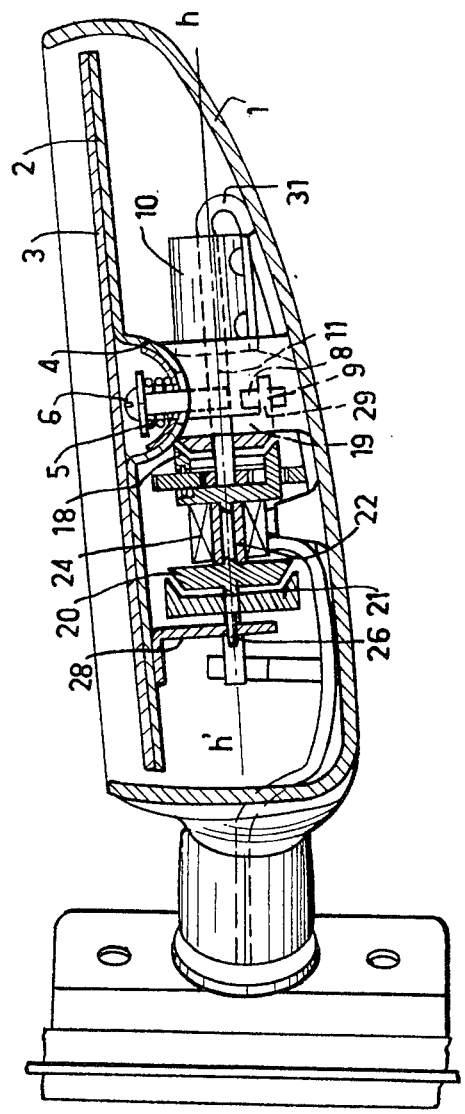

ELECTRIC DEVICE CONTROLLING THE MOVEMENT OF THE MIRROR IN AN EXTERNAL REARVIEW MIRROR UNIT

The present invention relates to an external rearview mirror unit having an electrically controlled directable mirror, and more particularly to an electric mirror control device in a rearview mirror unit having a directable mirror.

Safety conditions are becoming increasingly exacting and demand greater driving convenience, and in particular greater comfort and ease in respect of rear vision. It is therefore important to be able to adjust the position of the mirror in an external rearview mirror unit or units from inside the vehicle, particularly the position of the nearside external rearview mirror unit, which is difficult to reach.

The solutions applied hitherto are complex and have disadvantages. Known electrically controlled rearview mirror units are often provided with a complicated and expensive system, which in addition increases the size and weight of the mirror unit. Known rearview mirror units in fact very often require a plurality of motors and a plurality of reduction gear systems, because the small motors used have far too high a speed to be used direct and must therefore be accompanied by a substantial reduction gear system in order to bring about the slow movement of the mirror. Furthermore, known rearview mirror units generally utilise drive systems consisting of pulleys and winding cables, whereby the system is complicated and made heavy.

An electric control device must be light and small in size in order to reduce the dimensions of the rearview mirror unit.

The object of the invention is an electric device for controlling a mirror in a rearview mirror unit, which provides a solution to this problem while achieving simplicity and economy.

To this end the electric control device of the invention comprises a motor connected to an epicyclic reduction gear train, this device being characterised in that it comprises a selector driven by a reduction gear train and two clutches interposed between the said selector and two cams respectively transmitting to the mirror two movements of rotation whose axes are substantially perpendicular to one another.

The present invention proposes an electric control device comprising only one motor and one reduction gear train. The motor drives the reduction gear train, which in turn drives one of the two cams transmitting the movement to the mirror, each of the two cams being selectively connected to the reduction gear train by means of a selector, with the aid of a clutch.

The invention has as an object a control device comprising a selector provided with a magnet and coupled to one or the other of the two cams by its displacement by means of a solenoid.

Other advantages and characteristics of the invention will be made clear in the course of the description given by way of example without limitation and with reference to the accompanying drawings, in which:

FIG. 1 is a view in vertical longitudinal section of a rearview mirror unit provided with a device according to the invention;

FIG. 2 is a view in longitudinal cross-section of a rearview mirror unit provided with a device according to the invention;

Figure 3:
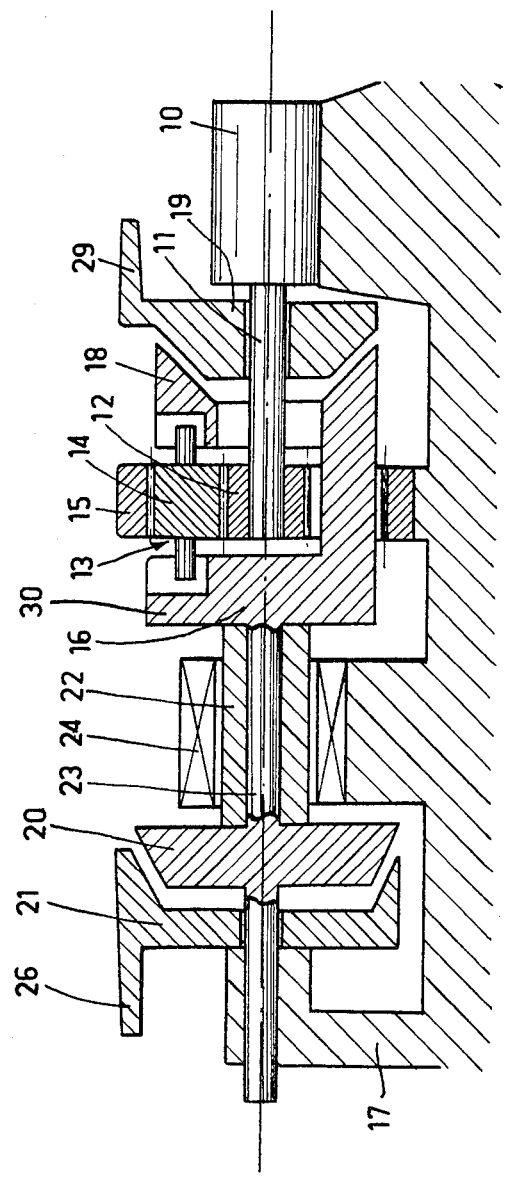
FIG. 3 is a view in section of the electric diagram of the device of the invention.

As illustrated in FIGS. 1 and 2, the electric device controlling a mirror in a rearview mirror unit according to the invention is housed in a bowl-shaped casing 1 of an external rearview mirror unit. The bowl-shaped casing 1 supports a mirror holder plate 2 on which a mirror 3 is adhesively bonded or framed. In the embodiment illustrated the plate 2 is articulated by a ball joint, for example with the aid of a concave hemispherical portion which is carried by the bowl 1 and in which a convex spherical portion 4 disposed substantially at the centre of the mirror carrier plate 2 can turn. The two hemispherical parts are clamped together by a spring 5, which in turn is compressed by a screw 6 with the interposition of a hemispherical washer.

The electric control device of the invention which is illustrated in FIGS. 1 to 3 comprises a motor 10 able to turn in both directions and fixed inside the bowl 1. The motor 10 has a shaft 11 which transmits the rotary movement of the motor by means of an epicyclic reduction gear train 13. The epicyclic reduction gear train may be of the type comprising three planet gears 14 turning in a fixed planet gear ring wheel 15 and engaging a sun gear 12 on shaft 11.

The epicyclic reduction gear train 13 has a reduction equal to about 1/1000. It transmits the rotary movement of the shaft with reduction to a selector 16 mounted for rotation and longitudinal sliding in a bearing 17. The selector 16 comprises a body 23 and three plates 18, 30, and 20 rigidly joined to the said body 23, one of the end plates (18) having a concave frustoconical portion provided for coupling to a cam or operating element 19 having a corresponding convex conical portion, while the second end plate 20 comprises a frustoconical flywheel provided for engagement in the corresponding concave conical portion of a cam or operating element 21. The two conical portions 18 and 20 of the selector 16, together with the two corresponding conical cams 19 and 21, form two respective clutches. The cone opening angle of the conical portions in contact and also the power of the solenoid 24 are so selected as to permit slip between the two parts in contact when the torque between these two parts exceeds a determined value. When in fact that cam driven by the motor during operation reaches its limit position, the ability of the clutch to slip prevents the heating of the motor. Between its two conical portions 18 and 20 the selector 16 is provided with a magnet 22 rigidly jointed to the shaft 23 of the selector. The permanent magnet 22 is coupled to a solenoid 24 surrounding it.

The cam 19, which is mounted loose on the shaft 11 of the motor, is provided with a finger 29 which is engaged in the hole 8 of an L-shaped member 9. This L-shaped member 9 rigidly jointed to the mirror carrier plate 2 is situated on the vertical axis $v'v$. The cam 21 mounted loose on the shaft 23 of the selector 16 is provided with a finger 26 engaged in the hole 27 of a L-shaped member 28. This L-shaped member 28 rigidly jointed to the mirror carrier plate 2 is situated on the horizontal axis $h'h$. The operation of the device of the invention, as illustrated in FIGS. 1 to 3, will now be described. If it is desired to effect the "upward/downward" adjustment of the rearview mirror unit, that is to say to pivot the mirror 3 about the horizontal axis $h'h$, the control means connected by the wires 31 to the solenoid 24 are suitably operated. The energisation of the solenoid 24 causes the permanent magnet 22 to slide or be displaced along the horizontal axis of the magnet 22, carrying with it the selector 16. The conical portions 18 and 19 forming a clutch are coupled to one another in order to permit the transmission of the movement of the motor to the cam 19.

When the control means connected by the wire 31 to the motor 10 are suitably operated, the motor is turned in the direction corresponding to the direction of rotation desired for the mirror. The motor 10 drives the epicyclic reduction gear train 13, which reduces the rotary movement in a ratio equal to about 1/1000, and transmits this movement to the cam 19 and to its finger 29. The finger 29 moves perpendicularly to the mirror 3 and displaces the latter for the "upward/downward" adjustment of the rearview mirror unit by acting on the L-shaped member 9.

When the mirror reaches its limit position of rotation, which is about 7° on each side in relation to the horizontal plane, the cam 19 stops turning and the element 18 slips on the conical portion of the cam 19 until the motor 10 is stopped or its movement reversed.

When it is desired to effect the "right/left" adjustment of the rearview mirror, that is to say to pivot the mirror about the vertical axis v'v, the control means connected to the solenoid 24 are operated in such a manner that the energisation of the solenoid causes the permanent magnet 22 to slide towards the cam 21. Since the magnet 22 is rigidly joined to the selector 16, its movement drives the selector towards the cam 21 and causes the conical flywheel 20 to engage in the corresponding conical portion of the cam 21. The motor 10 is put into operation and its rotary movement is transmitted to the reduction gear train and to the selector. The selector turns at a reduced speed of rotational equal to about 1/1000 th of the rotational speed of the motor, and it drives the cam 21 and the finger 26 engaged in the L-shaped member 28. The finger 26 drives the mirror in a movement perpendicular to the latter, which is moved around its vertical axis v'v, thus effecting the right/left adjustment.

At the end of the movement of the mirror, which corresponds to about 7° in relation to the vertical plane, the cam 26 is locked and the conical flywheel 20 slips on the corresponding conical portion of the cam until the motor 10 is stopped or its rotation is reversed.

The electric control device of the invention may be connected to the mirror by connection and transmission means, such as L-shaped members, different from those described and illustrated in FIGS. 1 to 3.

The invention is obviously not limited to the embodiment illustrated and described above, but on the contrary covers all variants thereof.

I claim:

1. A rear-view mirror assembly comprising a housing, a reflective surface mounted in said housing for movement on first and second axes of rotation, said first axis of rotation being different to said second axis of rotation, an electrical motor, rotary drive means including a reduction gear coupled to said electrical motor, first and second driven means for rotating said reflective surface on said first and second axes of rotation respectively and selector means for selectively coupling said reduction gear to said first and second driven means, said first and second driven means each comprising a clutch having first and second engageable members, each of said first engageable members being constantly connected to said reduction gear and selectively connected to a respective one of said second engageable members by said selector means.

2. An assembly according to claim 1 wherein said first selector means comprises a body to which said first engageable members are fixed, and includes means for axially displacing said body for selectively moving said first engageable members towards and away from said second engageable members, said axial displacement occurring along an axis passing through said second engageable members.

3. An assembly according to claim 2 wherein said first and second engageable members are first and second conical clutch plates respectively.

4. An assembly according to claim 3, wherein there is a shaft having a common axis of rotation with said rotary drive means, and said first and second engageable members are fast on said shaft.

5. An assembly according to claim 4 wherein said reduction gear is an epicyclic gear and is located between one of said first engageable members and a third member fast on said shaft.

6. An assembly according to claim 5 wherein said epicyclic gear includes a planet gear ring, at least one planet gear and a sun gear, and said one first engageable member and said third member are coupled to said at least one planet gear, and said motor is coupled to said sun gear.

7. An assembly according to claim 6, wherein said one first member and said third member are interconnected by a member passing through said planet gear ring.

8. An assembly according to claim 7 wherein there is a solenoid for axially displacing said shaft for the selective engagement of said first and second engageable members.

9. A rear-view mirror assembly comprising a housing, a reflective surface mounted within said housing, means carried by said housing mounting said reflective surface for movement along first and second axes of rotation, said first axis of rotation being generally normal with respect to said second axis of rotation, said mirror assembly further comprising control means mounted within said housing for selectively effecting movement of said reflective surface about said first and second axes of rotation, said control means including a reversible electric motor capable of imparting rotary motion about a third axis, single reduction gear train spaced from and coupled to said motor for providing a reduced speed rotary motion output about said third axis, first and second driven means coupled to said reflective surface for moving said reflective surface about said first and second axes of rotation respectively, selector means for selectively coupling the reduced speed rotary motion output to said first and second driven means, said selector means having selectively engageable first and second clutch means for selectively rotating said first and second driven means, and a solenoid capable of selective imparting reciprocal movement to said selector means for selectively engaging said first and second clutch means with said first and second driven means whereby said reflective surface is selectively moved about said first and second axes of rotation respectively.

10. A rear-view mirror assembly as claimed in claim 9 wherein said motor has an output shaft lying along said third axis, and said reduction gear train is directly coupled to said output shaft.

* * * * *